US009804646B2

(12) United States Patent
Jaussi et al.

(10) Patent No.: US 9,804,646 B2
(45) Date of Patent: Oct. 31, 2017

(54) HOST CONTROLLED IO POWER MANAGEMENT

(75) Inventors: James E. Jaussi, Hillsboro, OR (US); Stephen R. Mooney, Mapleton, UT (US); Howard L. Heck, Hillsboro, OR (US); Bryan K. Casper, Portland, OR (US); Frank T. Hady, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 13/995,591

(22) PCT Filed: Oct. 17, 2011

(86) PCT No.: PCT/US2011/056574
§ 371 (c)(1),
(2), (4) Date: Jun. 19, 2013

(87) PCT Pub. No.: WO2013/058729
PCT Pub. Date: Apr. 25, 2013

(65) Prior Publication Data
US 2013/0283070 A1    Oct. 24, 2013

(51) Int. Cl.
*G06F 1/00* (2006.01)
*G06F 1/26* (2006.01)
*G06F 1/32* (2006.01)

(52) U.S. Cl.
CPC ............... *G06F 1/26* (2013.01); *G06F 1/266* (2013.01); *G06F 1/3203* (2013.01)

(58) Field of Classification Search
CPC .......... G06F 1/26; G06F 1/3203; G06F 1/266; Y02B 60/1217
See application file for complete search history.

(56) References Cited

U.S. PATENT DOCUMENTS

| 5,859,522 | A | * | 1/1999 | Theobald | .............. | H02J 7/0004 |
| | | | | | | 320/106 |
| 6,064,554 | A | * | 5/2000 | Kim | ........................ | G06F 1/266 |
| | | | | | | 361/64 |
| 6,662,301 | B1 | | 12/2003 | Sekine et al. | | |

(Continued)

FOREIGN PATENT DOCUMENTS

CN      1987487 A    6/2007
CN    101419495 A    4/2009

(Continued)

OTHER PUBLICATIONS

International Search Report and Written Opinion received for PCT Application No. PCT/US2011/056574, mailed on May 7, 2012, 9 pages.

(Continued)

*Primary Examiner* — Mohammed Rehman
*Assistant Examiner* — Gayathri Sampath
(74) *Attorney, Agent, or Firm* — Jordan IP Law, LLC

(57) ABSTRACT

Systems and methods of interconnecting devices may include an input/output (IO) connector having a buffer with an integrated voltage regulator. The integrated voltage regulator may include a first supply output and a second supply output, wherein the IO connector includes an IO power contact coupled to the first supply output. The IO connector may also include a logic power contact coupled to the second supply output. In one example, a host device may issue power management commands to the buffer in order to scale the second supply output independently of the first supply output.

24 Claims, 3 Drawing Sheets

(56) References Cited

U.S. PATENT DOCUMENTS

| | | | |
|---|---|---|---|
| 6,772,356 B1* | 8/2004 | Qureshi | G06F 1/26 257/E23.179 |
| 2003/0070103 A1 | 4/2003 | Kim | |
| 2004/0251878 A1* | 12/2004 | Veselic | H02J 7/00 320/141 |
| 2005/0262367 A1 | 11/2005 | Shih | |
| 2006/0015757 A1* | 1/2006 | Tupman | G06F 1/266 713/300 |
| 2006/0031690 A1* | 2/2006 | Chung | G06F 1/3203 713/300 |
| 2006/0200685 A1* | 9/2006 | Jones | G06F 1/26 713/300 |
| 2007/0088964 A1* | 4/2007 | Lee | G06F 1/266 713/300 |
| 2007/0143638 A1* | 6/2007 | Dobyns | G01R 1/06788 713/300 |
| 2009/0249090 A1* | 10/2009 | Schmitz | G06F 1/3203 713/300 |
| 2010/0067197 A1* | 3/2010 | Guccione | G06F 1/26 361/728 |
| 2010/0205463 A1 | 8/2010 | Magnusson | |

FOREIGN PATENT DOCUMENTS

| | | |
|---|---|---|
| WO | 2011102947 A1 | 8/2011 |
| WO | 2013/058729 A1 | 4/2013 |

OTHER PUBLICATIONS

International Preliminary Report on Patentability and Written Opinion received for PCT Patent Application No. PCT/US2011/056574 mailed on May 1, 2014, 6 pages.

* cited by examiner

HOST CONTROLLED IO POWER MANAGEMENT

BACKGROUND

Technical Field

Embodiments generally relate to input/output (IO) interfaces. More particularly, embodiments relate to an IO connector configuration having separate power supply contacts for peripheral device IO and logic circuits.

Discussion

Computing systems may include one or more USB (Universal Serial Bus, e.g., USB Specification 3.0, Rev. 1.0, Nov. 12, 2008, USB Implementers Forum) ports to support IO communication with peripheral components such as keyboards, mice, cameras, and so forth. The contacts of a typical USB port may have a single dedicated pin to power peripheral devices. Accordingly, the host computing system may have limited ability to optimize peripheral devices for power and performance.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an input/output (IO) connector having a buffer with an integrated voltage regulator. The IO connector may also include an IO power contact coupled to the integrated voltage regulator, and a logic power contact coupled to the integrated voltage regulator.

Embodiments can also include a system having a local host device and an IO connector. The IO connector may include a buffer, an IO power contact and a logic power contact, wherein the buffer has an integrated voltage regulator. The IO power contact can be coupled to the integrated voltage regulator and the logic power contact can be coupled to the integrated voltage regulator.

Other embodiments may involve a computer implemented method in which a connection of a peripheral device to an IO connector is detected. The IO connector can have an IO power contact coupled to an integrated voltage regulator and a logic power contact coupled to the integrated voltage regulator. The method may also provide for disabling a supply output to at least one of the IO power contact and the logic power contact if the peripheral device is an external host device.

In addition, embodiments may include a computer readable storage medium having a set of instructions which, if executed by a processor, cause a computer to receive a notification of a connection between a peripheral device and an IO connector having an IO power contact coupled to an integrated voltage regulator of the IO connector and a logic power contact coupled to the integrated voltage regulator. The instructions can also cause a computer to conduct a power management analysis, and instruct the IO connector to adjust a supply output to at least one of the IO power contact and the logic power contact based on the power management analysis.

Figure 1:
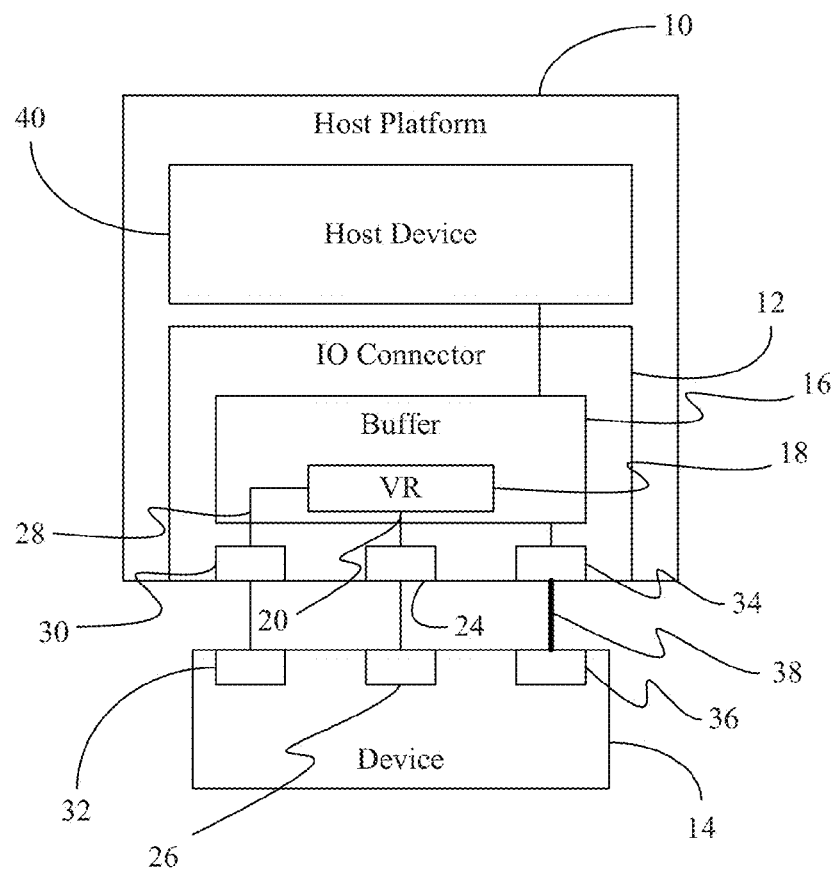
FIG. 1 is a block diagram of an example of a connection between a host platform and a peripheral device according to an embodiment.

Turning now to FIG. 1, a host platform 10 is shown in which an IO connector 12 of the host platform 10 is connected to a peripheral device 14. The host platform 10 could include, for example, a personal digital assistant (PDA), mobile Internet device (MID), wireless smart phone, media player, imaging device, smart tablet, laptop computer, desktop personal computer (PC), server, etc., or any combination thereof. In general, the peripheral device 14 may include, for example, a keyboard, mouse, camera, PDA, MID, wireless smart phone, media player, imaging device, smart tablet, etc., or any combination thereof. In the illustrated example, the IO connector 12 includes a buffer 16 having an integrated voltage regulator (VR) 18 capable of providing multiple, dynamically scalable, supply voltages to both on-platform components and off-platform components.

In particular, the illustrated VR 18 has a scalable first supply output (e.g., $V_{cc}$ IO) 20 coupled to an IO power contact 24, which in turn makes an electrical connection with an IO power contact 26 of the peripheral device 14 when an IO connector (not shown) of the peripheral device 14 is mated with (e.g., plugged into) the IO connector 12 of the host platform 10. The IO power contact 26 of the peripheral device 14 can be coupled to one or more IO signaling circuits (not shown) of the peripheral device 14, wherein the IO signaling circuits are used to control the exchange of data with the host platform 10 via IO signaling contacts 34, 36 and IO lanes 38. The IO lanes 38 may employ single-ended signaling and/or differential signaling techniques, depending upon the circumstances. The connection between the first supply output 20 of the integrated VR 18 and the IO power contact 26 therefore enables the IO signaling circuits of the peripheral device 14 to be powered by the host platform 10.

The illustrated VR 18 also has a scalable second supply output (e.g., $V_{cc}$ logic) 28 coupled to a logic power contact 30 of the IO connector 12, which makes an electrical connection to a corresponding logic power contact 32 of the peripheral device 14 when the IO connector of the peripheral device 14 is mated with the IO connector 12. The logic power contact 32 may be coupled to non-signaling circuits of the peripheral device 14 such as, for example, optical/motion processing logic (e.g., in a mouse), keystroke processing logic (e.g., in a keyboard), and so forth. Indeed, the IO connector 12 could include multiple logic power contacts, with each one being coupled to a separate scalable supply output of the integrated VR 18. Accordingly, the connection between the second supply output 28 of the integrated VR 18 and the logic power contact 32 enables other logic on the peripheral device 14 to be powered by the host platform 10 independently of the IO signaling circuits. In this regard, the illustrated host platform 10 further includes a host device 40 such as a processor, platform controller hub (PCH), and/or other chipset component 42 that is capable of instructing the buffer 16 to dynamically adjust the second supply output 28 as well as the first supply output 20.

For example, the host device 40 might issue one or more power management commands to the buffer 16, wherein the buffer 16 may increase, decrease, or even disable the second supply output 28 in response to the power management commands, while maintaining first supply output 20 at the same or a different level. The adjustments may be, for example, a function of data rate so that the power consumption of the peripheral device 14 can be optimized for different operating modes/speeds. Thus, the host device 40 could scale down the voltage applied to the logic power contact 32 at lower speed operating modes in order to conserve power and/or extend battery life. The buffer 16 could alternatively reside on the host device 40 or elsewhere on the host platform 10.

Figure 2:
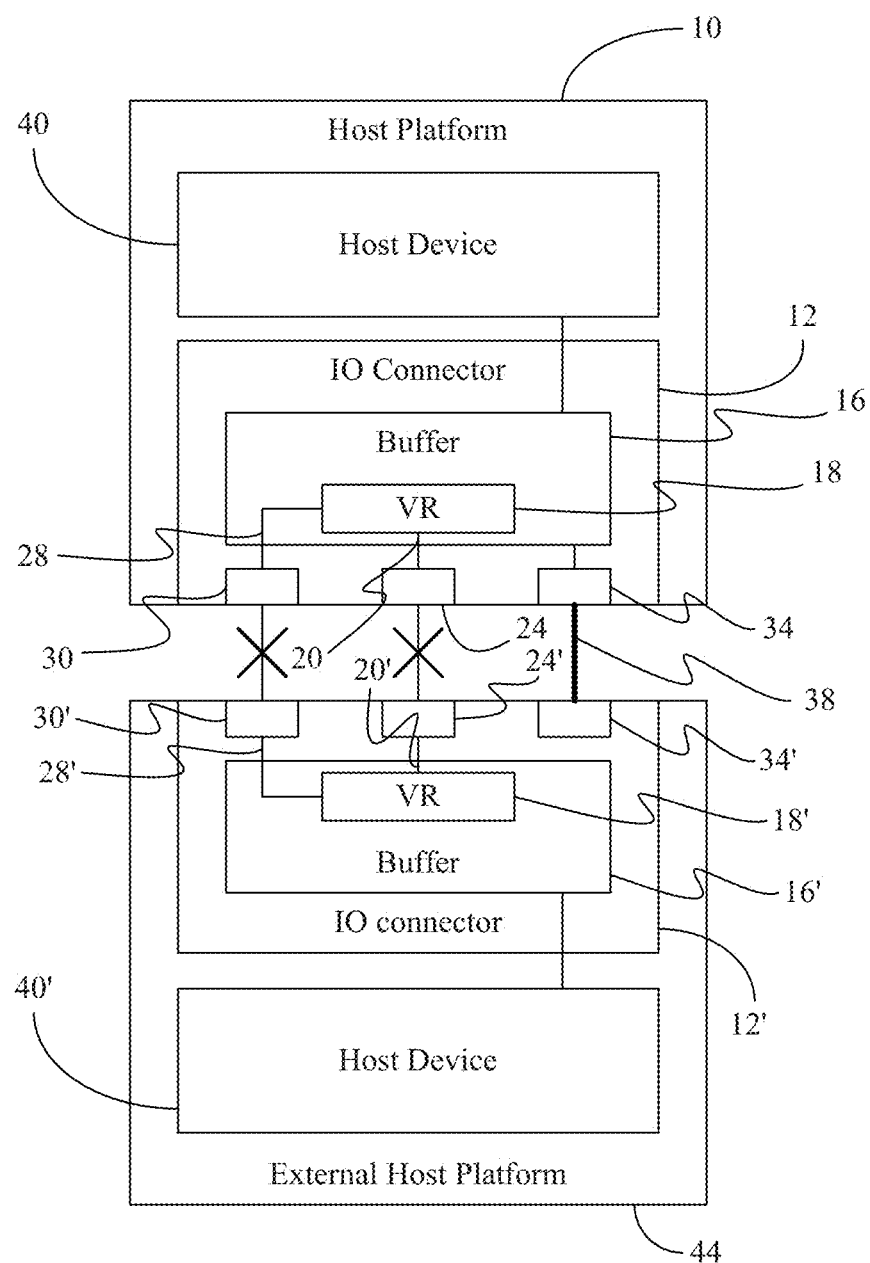
FIG. 2 is a block diagram of an example of a connection between two host platforms according to an embodiment.

FIG. 2 shows a scenario in which another (e.g., external) host platform 44 is connected to the local host platform 10 via the IO connector 12. In the illustrated example, the external host platform 44 also includes an IO connector 12' having a buffer 16' with an integrated VR 18'. Because the integrated VR 18' also powers its power contacts 24', 30' with first and second supply outputs 20', 28', respectively, the illustrated architecture is configured to prevent power conflicts from occurring between the platforms 10 and 44. In particular, the illustrated buffer 16 detects a connection between the platforms 10 and 44, and determines whether the platform 44 is a host platform (e.g., provides power to other devices). If so, the first and second supply outputs 20, 28 may be disabled so that no power is delivered to the power contacts 24, 30, respectively. Similarly, the buffer 16' of the external host platform 44 may determine that the platform 10 is a host platform, and disable its first and second supply outputs 20', 28' accordingly. The detection of the external power source may be through over-current detection mechanisms or other suitable technique depending upon the circumstances.

The platforms 10, 44 in the illustrated example could also negotiate with one another over which device will provide power to the other. In such a case, the negotiation might take place between the host device 40 of the host platform 10, and a host device 40' of the external host platform 44 via the IO signaling contacts 34, 34' and IO lanes 38. The underlying signaling protocol may be in accordance with, for example, USB technology, DisplayPort (DP, e.g., Embedded DisplayPort Standard (eDP) Version 1.3, January 2011, Video Electronics Standards Association) technology, High-Definition Multimedia interface (HDMI, e.g., HDMI Specification, Ver. 1.3a, Nov. 10, 2006, HDMI Licensing, LLC) technology, Thunderbolt (e.g., Thunderbolt™ Technology: The Transformational PC I/O, 2011, Intel Corporation) technology, Peripheral Components interconnect Express (PCI-e, e.g., PCI Express x16 Graphics 150W-ATX Specification 1.0, PCI Special Interest Group) technology, and so forth.

Figure 3:
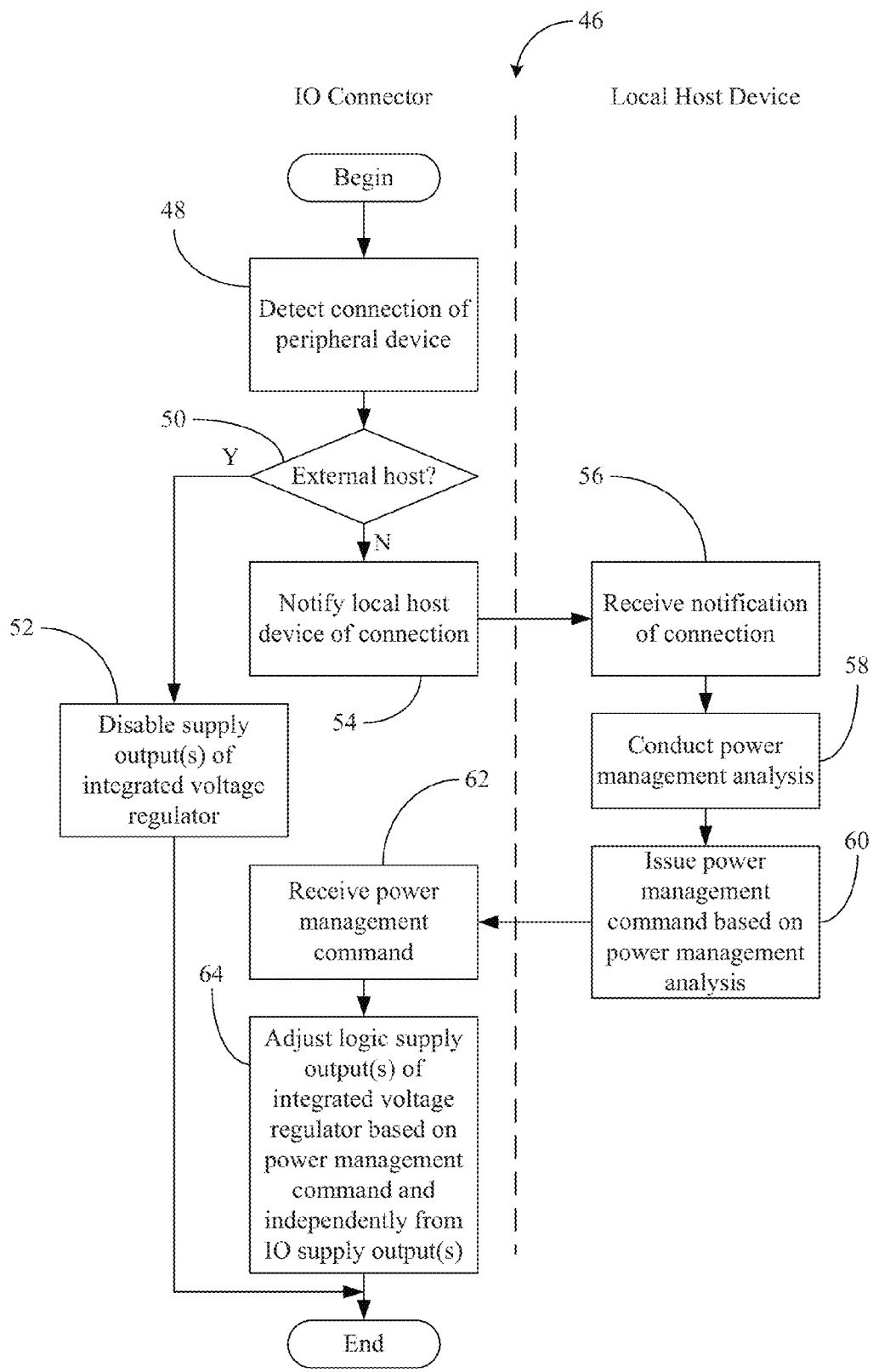
FIG. 3 is a flowchart of an example of a method managing the power consumption of a peripheral device according to an embodiment.

Turning now to FIG. 3, a method 46 of managing the power consumption of a peripheral device is shown. The method 46 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 46 may be written in any combination of one or more programming languages, including an object oriented programming language such as C++ or the like and conventional procedural programming languages, such as the "C" programming language or similar programming languages. Moreover, the method 46 could be implemented using any of the aforementioned circuit technologies.

Processing block 48 provides for detecting a connection of a peripheral device to an IO connector of a host platform. A determination may be made at block 50 as to whether the peripheral device is an external host platform. If so, the supply outputs of the IO connector may be disabled at block 52. Block 52 may also involve negotiating a power delivery configuration between the two platforms, as already discussed. If the peripheral device is not a host device, illustrated block 54 notifies a local host device of the connection. The local host device may include, for example, a chipset component such as a processor, PCH or other appropriate system component. Upon receiving the notification at block 56, the local host device conducts a power management analysis. The power management analysis, which could also be conducted on an ongoing basis or in response to one or more other triggers, may involve determining the amount of available power on the local host platform. The amount of available power could be a function of, for example, whether the local host platform is wall powered or battery powered, the processing demand of the local host platform, the remaining battery life if the platform is battery powered, and so on. Illustrated block 60 issues one or more power management commands to the IO connector based on the power management analysis.

In response to receiving a power management command at block 62, the IO connector may adjust one or more logic supply outputs of an integrated voltage regulator at block 64. The adjustment may involve decreasing a logic supply output (e.g., low available power or low data rate), increasing a logic supply output (e.g., high available power or high data rate), deactivating a logic supply output, and so forth. In addition, block 64 could provide for adjusting an IO supply output of the IO connector. The adjustment to the logic supply output may be independent, however, of any adjustments that might be made to the IO signaling power supply.

Figure 4:
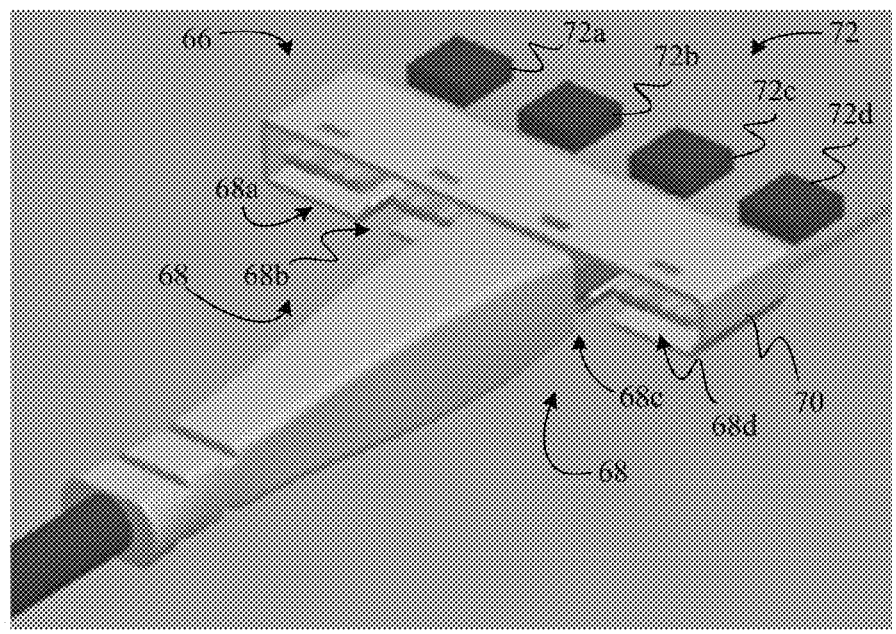
FIG. 4 is a perspective view of an example of an IO connector having multiple sets of IO contacts according to an embodiment.

FIG. 4 shows an IO connector 66 having multiple sets of IO contacts 68 (68a-68d) positioned side-by-side within a shared housing 70. Each set of IO contacts 68 may include one or more logic power contacts configured to provide power to a peripheral device independently from an IO power contact that provides power to the IO signaling circuits of the peripheral device. In the illustrated example, each set of IO contacts 68 has a corresponding semiconductor package 72 (72a-72d) that includes a buffer having an integrated voltage regulator. An alternative configuration might include a single semiconductor package with a shared buffer that provides power to each of the sets of IO contacts 68.

Power management in such a configuration could take into consideration the number of peripheral devices coupled to the IO connector 66, as well as the individual power requirements of such peripheral devices. For example, the local host device might determine that one connected peripheral device is a high data rate device, whereas another connected peripheral device is a low data rate device. Accordingly, the local host device might instruct the buffer associated with the low data rate device to decrease the power applied to its corresponding logic power contact and instruct the buffer associated with the high data rate device to increase the power applied to its corresponding logic power contact. Moreover, the voltage scaling determination may be made in view of the power available from the local host platform (e.g., wall or battery power, processing overhead, performance requirements).

Techniques described herein may therefore facilitate the construction of more scalable IO interfaces while separating external and internal scaling requirements. Additionally, power optimized interfaces may be achieved based on controllable device power supplies. In particular, host devices can optimize peripheral device performance based on system level requirements.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
    a local host device; and
    an input/output (IO) connector including a buffer that is to detect a connection of a peripheral device that is external to the local host device to the IO connector, an IO power contact and a logic power contact, the buffer having an integrated voltage regulator coupled to the IO power contact and the logic power contact, wherein both the IO power contact and the logic power contact are to provide connection to the peripheral device, wherein the IO power contact is to supply power to a signaling circuit on the peripheral device, and wherein power supplied at the logic power contact is adjustable independently of power supplied to the signaling circuit, wherein the local host device is to conduct a power management analysis to determine an amount of power on the local host device that is available to be provided to the peripheral device,
    wherein the buffer is to disable a supply output of the integrated voltage regulator to at least one of the IO power contact and the logic power contact if the peripheral device is an external host device, and
    wherein the IO connector is to adjust the supply output to at least one of the IO power contact and the logic power contact based on the power management analysis.

2. The system of claim 1, wherein the buffer is to:
    notify the local host device of the connection;
    receive a power management command from the local host device; and
    adjust the supply output to the logic power contact in response to the power management command.

3. The system of claim 2, wherein the buffer is to decrease the supply output to the logic power contact in response to the power management command and independently from the supply output to the IO power contact.

4. The system of claim 2, wherein the buffer is to increase the supply output to the logic power contact in response to the power management command and independently from the supply output to the IO power contact.

5. The system of claim 2, wherein the host device is to:
    receive a notification of the connection;
    conduct a power management analysis based on a data rate between the IO connector and the peripheral device; and
    generate the power management command based on the power management analysis.

6. The system of claim 5, wherein the power management analysis is to include a determination as to whether the system is wall powered or battery powered.

7. The system of claim 2, wherein the IO connector further includes a plurality of logic power contacts coupled to the integrated voltage regulator, and wherein the buffer is to adjust the supply output to at least one of the plurality of logic power contacts in response to the power management command.

8. An input/output (IO) connector comprising:
    a buffer having an integrated voltage regulator, wherein the buffer is to detect a connection of a peripheral device that is external to the local host device to the IO connector;
    an IO power contact coupled to the integrated voltage regulator; and
    a logic power contact coupled to the integrated voltage regulator, wherein both the IO power contact and the logic power contact are to provide connection to the peripheral device wherein the IO power contact is to supply power to a signaling circuit on the device that is external to the IO connector based on a power management analysis to determine an amount of power available to be provided to the peripheral device, and wherein power supplied at the logic power contact is adjustable independently of power supplied to the signaling circuit, wherein the buffer is to disable a supply output of the integrated voltage regulator to at least one of the IO power contact and the logic power contact if the peripheral device is an external host device, and wherein the IO connector is to adjust the supply output to at least one of the IO power contact and the logic power contact based on the power management analysis.

9. The IO connector of claim 8, wherein the buffer is to:
notify a host device of the connection;
receive a power management command from the host device, wherein the power management command is based on a data rate between the IO connector and the peripheral device; and
adjust the supply output to the logic power contact in response to the power management command.

10. The IO connector of claim 9, wherein the buffer is to decrease the supply output to the logic power contact in response to the power management command and independently from the supply output to the IO power contact.

11. The IO connector of claim 9, wherein the buffer is to increase the supply output to the logic power contact in response to the power management command and independently from the supply output to the IO power contact.

12. The IO connector of claim 9, further including a plurality of logic power contacts coupled to the integrated voltage regulator, wherein the buffer is to adjust the supply output to at least one of the plurality of logic power contacts in response to the power management command.

13. A computer implemented method comprising:
detecting a connection of a peripheral device to an input/output (IO) connector having both an IO power contact coupled to an integrated voltage regulator and a logic power contact coupled to the integrated voltage regulator, wherein both the IO power contact and the logic power contact are with respect to the peripheral device, wherein the IO power contact is to supply power to a signaling circuit on the peripheral device based on a power management analysis to determine an amount of power available to be provided to the peripheral device, and wherein power supplied at the logic power contact is adjustable independently of power supplied at the IO power contact;
disabling a supply output of the integrated voltage regulator to at least one of the IO power contact and the logic power contact if the peripheral device is an external host device; and
adjusting the supply output to at least one of the IO power contact and the logic power contact based on the power management analysis.

14. The method of claim 13, further including: receiving a power management command at the IO connector; and
adjusting the supply output to the logic power contact in response to the power management command.

15. The method of claim 14, wherein adjusting the supply output to the logic power contact includes decreasing the supply output to the logic power contact independently from the supply output to the IO power contact.

16. The method of claim 14, wherein adjusting the supply output to the logic power contact includes increasing the supply output to the logic power contact and independently from the supply output to the IO power contact.

17. The method of claim 14, further including conducting a power management analysis, wherein the power management command is issued based on the power management analysis and the power management analysis is based on a data rate between the IO connector and the peripheral device.

18. The method of claim 17, wherein the power management analysis includes a determination as to whether a system including the IO connector is wall powered or battery powered.

19. The method of claim 14, further including adjusting the supply output to at least one of a plurality of logic power contacts in response to the power management command.

20. A non-transitory computer readable storage medium comprising a set of instructions which, if executed by a processor, cause a computer to:
receive a notification of a connection between a peripheral device and an input/output (IO) connector having both an IO power contact coupled to an integrated voltage regulator of the IO connector and a logic power contact coupled to the integrated voltage regulator, wherein both the IO power contact and the logic power contact are with respect to the peripheral device;
conduct a power management analysis to determine an amount of power available to be provided to the peripheral device;
disable a supply output of the integrated voltage regulator to at least one of the IO power contact and the logic power contact if the peripheral device is an external host device; and
instruct the IO connector to adjust the supply output to at least one of the IO power contact and the logic power contact based on the power management analysis,
wherein the IO power contact supplies power to a signaling circuit on the peripheral device, and wherein power supplied at the logic power contact is adjustable independently of power supplied at the IO power contact.

21. The medium of claim 20, wherein the power management analysis is to include a determination as to whether a system including the IO connector is wall powered or battery powered.

22. The medium of claim 20, wherein a power management command is to be issued to the IO connector, and wherein the power management analysis is based on a data rate between the IO connector and the peripheral device.

23. The medium of claim 22, wherein the power management command is to instruct the IO connector to decrease the supply output to the logic power contact independently from the supply output to the IO power contact.

24. The medium of claim 22, wherein the power management command is to instruct the IO connector to increase the supply output to the logic power contact independently from the supply output to the IO power contact.

* * * * *